United States Patent
Bernreitner et al.

(10) Patent No.: US 9,328,233 B2
(45) Date of Patent: May 3, 2016

(54) MULTICOMPONENT POLYPROPYLENE COMPOSITIONS FOR USE IN INJECTION MOULDED ARTICLES

(75) Inventors: Klaus Bernreitner, Linz (AT); Juliane Braun, Linz (AT); Christelle Grein, Linz (AT); Georg Grestenberger, St. Peter in der AU (AT); Claudia Kniesel, Linz (AT)

(73) Assignee: Borealis AG, Vienna (AT)

(*) Notice: Subject to any disclaimer, the term of this patent is extended or adjusted under 35 U.S.C. 154(b) by 136 days.

(21) Appl. No.: 13/699,022

(22) PCT Filed: May 19, 2011

(86) PCT No.: PCT/EP2011/058174
§ 371 (c)(1),
(2), (4) Date: Feb. 19, 2013

(87) PCT Pub. No.: WO2011/144705
PCT Pub. Date: Nov. 24, 2011

(65) Prior Publication Data
US 2013/0143996 A1    Jun. 6, 2013

(30) Foreign Application Priority Data
May 21, 2010 (EP) .................................... 10163620

(51) Int. Cl.
| | | |
|---|---|---|
| *C08L 33/10* | (2006.01) | |
| *C08K 3/34* | (2006.01) | |
| *C08L 23/14* | (2006.01) | |
| *C08K 3/00* | (2006.01) | |
| *C08L 23/08* | (2006.01) | |

(52) U.S. Cl.
CPC ............... *C08L 33/10* (2013.01); *C08L 23/142* (2013.01); *C08K 3/0033* (2013.01); *C08L 23/0869* (2013.01)

(58) Field of Classification Search
None
See application file for complete search history.

(56) References Cited

U.S. PATENT DOCUMENTS

| | | | | |
|---|---|---|---|---|
| 4,888,391 | A * | 12/1989 | Domine et al. | ............... 525/221 |
| 6,696,520 | B1 | 2/2004 | Pellegatti | |
| 6,831,131 | B2 * | 12/2004 | Bouilloux et al. | ............ 525/191 |

FOREIGN PATENT DOCUMENTS

| | | |
|---|---|---|
| CN | 101412830 | 4/2009 |
| EP | 1788022 | 5/2007 |
| EP | 1847565 | 10/2007 |
| EP | 2048185 | 4/2009 |
| JP | 2006321914 | 11/2006 |
| WO | 2006024579 | 3/2006 |

OTHER PUBLICATIONS

International Search Report for PCT/EP2011/058174 dated Jun. 29, 2011.
Gururajan, "Effect of Poly(ethylene methyl acrylate) Copolymer on Thermal, Morphological, and Mechanical Properties of Polypropylene Copolymer Blown Films", Journal of Applied Science, 2007, vol. 107, 2500-2508.

* cited by examiner

*Primary Examiner* — Vu A Nguyen
(74) *Attorney, Agent, or Firm* — Gardner Groff Greenwald & Villanueva, PC

(57) ABSTRACT

A composition comprising: (I) 60 to 92.5 wt % of a first component which is a polypropylene polymer comprising a) 40 to 85 wt % of a propylene polymer A having a melt flow rate ($MFR_2$) between 0.01 and 300 g/10 min, and b) 15 wt % or more of at least one propylene ethylene copolymer; and (II) 2.5 to 30 wt % of a second component comprising at least one ethylene alkyl (meth)acrylate polymer; and optionally (III) 5 to 25 wt % of at least one filler.

11 Claims, 1 Drawing Sheet

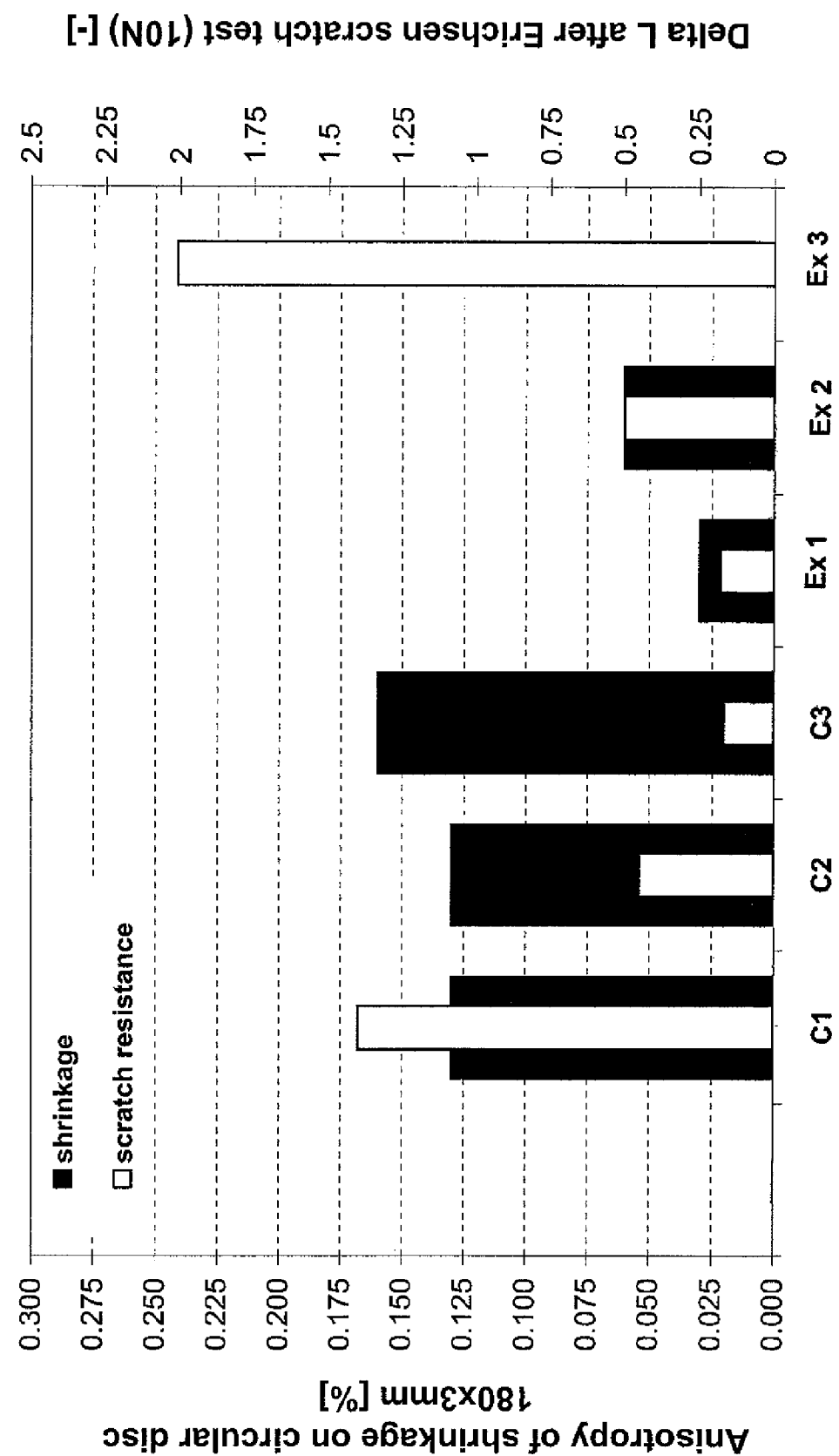

MULTICOMPONENT POLYPROPYLENE COMPOSITIONS FOR USE IN INJECTION MOULDED ARTICLES

IN THE CROSS-REFERENCE TO RELATED APPLICATIONS

This application is a U.S. national phase application under 35 USC 371 of international application number PCT/EP2011/058174, filed May 19, 2011, which claims priority to European Application No. 10163620.7, filed May 21, 2010, which is hereby incorporated herein by reference in its entirety for all purposes.

This invention relates to a new material for use in injection moulded articles showing superior scratch resistance and especially low shrink anisotropy. In particular, the invention relates to a multicomponent polypropylene polymer having added thereto at least one ethylene alkyl acrylate polymer.

Polypropylene resins are widely used to form a variety of useful materials due to their advantageous properties. The ability to tailor the stiffness-toughness balance in a broad range makes polypropylene resins well suited for producing tough and stiff structures such as body parts for automotive applications, which include exterior parts such as bumpers, air dams and other trim and interior parts as dash boards, airbag covers and the like.

One disadvantage of polypropylene resins is that due to their semicrystalline nature they are subject to significant moulding and shrinkage in most moulding processes. This means that in applications where dimensional tolerances are important the mould must be tailored to the specific composition and the specific moulding operation to yield a finished part of the precise dimension which is required. This shrinkage problem is particularly troublesome where the manufacturer has moulds tailored to a certain composition and moulding operation and subsequently wishes to substitute a different composition or alter the process to, for example, increase the cooling rate. This problem is enhanced because polypropylene resins show a shrinkage difference in the longitudinal and the transversal direction.

It is common practice to use all kind of fillers in order to enhance or fine-tune the property profile of polymers. A common filler for polyolefins is talc. This compound is used mainly due to its good cost-benefit ratio as it gives acceptable properties at very low cost. However, whilst talc usually improves the stiffness of a composition, it also has some negative effects on other properties. Depending on the base resin, the particle size and morphology of the talc as well as the production conditions, the talc can cause orientational inconsistencies in an injection moulded part. This leads to an anisotropy of mechanical properties and also influences the shrinkage behaviour of the part. Furthermore, the addition of talc in general increases the visibility of scratches. Talc is often white making scratches very obvious.

The combination therefore of talc and polypropylene can exacerbate any post moulding shrinkage issues which are present.

There is no desire to stop using polypropylenes as they offer such valuable properties but there is a need to deal with the issue of shrinkage and in particular the anisotropy observed in shrinkage.

The present inventors therefore sought ways to improve scratch resistance and in particular, to limit shrinkage anisotropy, e.g. associated with fillers such as talc. The present inventors have realised that the addition of ethylene alkyl acrylate copolymers to a polypropylene polymer in particular amounts reduces shrinkage anisotropy. These materials can be added instead of talc or in conjunction with talc to reduce the problems associated with shrinkage and in particular ensure that any shrinkage which occurs is more isotropic (i.e. shrinkage is similar in both longitudinal and transverse directions).

EP-A-1788022 describes polypropylene base materials similar to those suitable for use in the present invention in which low shrinkage is achieved by the addition of a LDPE or LLDPE component.

The present inventors have surprisingly found that even better results can be achieved using ethylene alkyl (meth) acrylate (EAA) copolymers. These copolymers can be used instead of or as well as additional polyethylene components and shrinkage anisotropy can be significantly reduced. Moreover, this reduction can be achieved whilst simultaneously improving the scratch resistance of the material.

Moreover, the compositions of the invention often became tougher with increasing EAA content. A significant increase in the tensile strain at break is also achieved using the composition of the invention. The combination of the invention therefore provides a composition with excellent mechanical properties.

It is also envisaged that the use of an EAA might allow the elimination of fatty acid amides from polymer compositions. These additives are often added to improve the scratch resistance of a material where their positive effect is based on migration of the molecules to the surface where they reduce the coefficient of friction. The main drawback of these additives is that they may increase the stickiness of the surface and also negatively influence the taste and odour and fogging properties. Negative gloss effects may also result.

Surprisingly, it has been found that an article made of a particular polypropylene resin in combination with an EAA possesses a low shrinkage and has in addition an excellent impact strength, at room and subzero temperatures, a balanced stiffness and a high scratch resistance.

The combination of polypropylene with an EAA is not new. US 2007/0066758 describes the combination of an anhydride modified polypropylene, a conventional polypropylene and an EAA in a composition designed for use with glass fibres.

In US2007/0049682 EAA forms the major component in a mixture containing a broadly defined polypropylene. The blend is said to improve scratch resistance however there must be at least 50 wt % of the EAA present.

In J Appl Polym Sci, Vol 107, 2500-2508, Gururajan et al investigate the effects of ethylene methyl acrylate on the properties of blown films formed from polypropylene copolymers. The polymer used contains a minor portion (less than 10 wt %) of an elastomeric EPR component.

The present inventors have found that the combination of low amounts of EAA with a particular two component polypropylene gives rise to a blend with ideal properties, especially for injection moulding.

Thus, viewed from one aspect the invention provides a composition comprising:
(I) 60 to 97.5 wt %, preferably 60 to 92.5 wt % of a first component which is a polypropylene polymer comprising
  a) 40 to 85 wt % of a propylene polymer A having a melt flow rate ($MFR_2$) between 0.01 and 300 g/10 min, and
  b) 15 wt % or more of at least one propylene ethylene copolymer; and
(II) 2.5 to 30 wt % of a second component comprising at least one ethylene alkyl (meth)acrylate polymer; and optionally
(III) 0 to 25 wt %, preferably 5 to 25 wt % of at least one filler.

Viewed from another aspect the invention provides a moulded article, especially an injection moulded article comprising a composition as hereinbefore defined.

Viewed from another aspect the invention provides a process for making a composition as hereinbefore defined comprising obtaining a first component (I) as hereinbefore defined and blending said first component with said second component (II) and optionally third component (III).

Viewed from another aspect the invention provides use of a composition as hereinbefore defined in injection moulding.

DETAILED DESCRIPTION OF THE INVENTION

Ethylene Alkyl (Meth)Acrylate Resin (EAA)

The composition of the invention comprises at least one ethylene alkyl (meth)acrylate resin. The term (meth)acrylate is intended to cover both methacrylates and acrylates, i.e. compounds of formula $CH_3$—$CH_2$=CHCOO— or $CH_2$=CHCOO—. The (meth) designates therefore the optional presence of the methyl group forming the methacrylate. It is preferred, however, if the EAA of the invention is an acrylate.

The term "alkyl" is used to designate a $C_{1-6}$ alkyl, preferably a $C_{1-4}$ alkyl. Preferably the EAA may be an ethylene methyl (meth)acrylate, ethylene ethyl (meth)acrylate or ethylene butyl (meth)acrylate resin, especially ethylene methyl acrylate, ethylene ethyl acrylate or ethylene butyl acrylate resin (EMA, EEA and EBA respectively). Whilst mixtures of these resins can be used, it is preferred if only one EAA is used. Most preferably this is EMA.

The amount of (meth)acrylate (relative to the amount of ethylene) in the EAA resin can vary over wide limits. It is preferred if there is an excess of ethylene present. Typical values range from 5 to 40 wt % of the acrylate, such as 10 to 35 wt % of the acrylate in the EAA polymer. We have surprisingly found that improvements in shrinkage properties can be achieved by using lower acrylate contents in the EAA polymer, e.g. 10 to 20 w % acrylate.

The density of the ethylene alkyl (meth)acrylate resin may be in the range of 935 to 960 kg/m$^3$. Its MFR$_2$/190° C. may range from 0.1 to 20 g/10 min, preferably 3 to 15 g/10 min.

The amount of ethylene alkyl (meth)acrylate resin employed in the composition of the invention may be from 2.5 to 30 wt %, such as 5 to 25 wt %, preferably 7.5 to 20 wt % of the composition. It is believed that having too much EAA present detracts from its ability to prevent anisotropy in shrinkage. Ideally, the amount of EAA present may range from 7.5 to 15 wt %.

These EAA polymers are commercially available materials and can be purchased from various suppliers, e.g. under the trade name Elvaloy™ (DuPont).

Polypropylene Polymer

The polypropylene polymer forms from 60 to 97.5 wt %, preferably 60 to 92.5 wt % of the overall composition. Preferably, this component forms 65 to 92.5 wt %, especially 70 to 92.5 wt % of the overall composition. There may be up to 92.5 wt %, such as up of the polypropylene polymer It will be appreciated that once the amounts of filler, acrylate polymer, additives, additional polyethylene and so on are fixed, the polypropylene polymer component can bring the composition up to 100 wt % of material.

The polypropylene component of the composition of the invention, i.e. the first component, itself contains at least two different components. These are called polymers A and B herein. Whilst more than two components may be present, it is preferred if first polymer component consists of two polymeric components. Polymer A is typically the matrix component and polymer B is an elastomeric component immiscible with polymer A. The polypropylene polymer is therefore preferably a heterophasic polypropylene polymer.

There should be 40 to 85 wt % of a propylene polymer A in the first component, e.g. 40 to 75 wt %. This polymer A should have a melt flow rate (MFR$_2$) between 0.01 and 300 g/10 min. The melt flow rate (MFR$_2$) of the propylene polymer A is preferably 80 to 250 g/10 min, more preferably 100 to 200 g/10 min.

Preferably, the polypropylene resin of the first component contains at least 40 wt %, more preferably at least 50 wt %, and even more preferred at least 55 wt % propylene polymer A.

Propylene polymer A is preferably an isotactic polymer, preferably made with a Ziegler-Natta catalyst. Metallocene catalysts are also suitable.

It is preferred if polymer A is a homopolymer. It can also be a propylene copolymer with one or more alpha olefin comonomers however the amount of comonomer should be low, e.g. less than 5 wt %, especially less than 2.5 wt %, more especially less than 1 wt %. The comonomer is preferably an ethylene monomer. If a copolymer is employed as polymer A, this is most preferably a propylene and ethylene copolymer with no more than 0.5 wt % copolymer, e.g. ethylene. Such a copolymer is preferably a random copolymer. Ideally, however polymer A is a homopolymer.

It is also preferred if the xylene soluble fraction of this component is low, e.g. less than 5 wt %, especially less than 3 wt %.

It is within the scope of the invention for polymer A to be formed from a mixture of two or more polymers each having an MFR in the range 0.01 to 300 g/10 min, e.g. two homopolymers or a homopolymer and a copolymer. This is not however preferred.

The polypropylene composition of the invention contains a second component, polymer B. Polymer B is a propylene ethylene copolymer in which propylene is ideally the largest component. The propylene composition should contain 15 wt % or more of this propylene copolymer (polymer B), e.g. up to 60 wt % thereof. Preferably, the polypropylene resin contains from 20 to 35 wt % ethylene-propylene copolymer (polymer B).

Ideally, polymer B contains at least 40 wt % propylene, more preferably at least 60 wt % propylene especially at least 75 wt % propylene (relative to the ethylene component).

The ethylene content of polymer B may therefore be up to 40 wt %, such as up to 25 wt %. There should preferably be at least 10 wt % of ethylene. Whilst other comonomers can be present, it is preferred of the polymer B component is a copolymer of propylene and ethylene only.

Polymer B can be a random copolymer or block copolymer, preferably a random copolymer.

Polymer B preferably has an intrinsic viscosity between 1 and 3.5 dl/g, more preferably from 1.1 to 3.3 dl/g.

It is within the scope of the invention for the polymer B component to be formed by a mixture of two or more polymer B components. This is not however preferred.

The combination of polymer A and polymer B gives rise to the first component. This combination may have an MFR 230° C./2.16 kg of 15 to 40 g/10 min, more preferably 20 to 35 g/min.

The tensile modulus of this blend might be between 800 and 1200 MPa, more preferably 900 and 1100 MPa. The elongation at break of the blend may be between 100 and 500%, more preferably 150 and 350%.

Even more preferably, in the propylene composition forming part of the composition of the invention, the C2 content may range from 10-30 wt %. It is also preferred if the xylene soluble content ranges from 15-35 wt %. The C2(XS) content may range from 40-70 wt %.

Overall Composition Properties

The composition of the invention preferably has an $MFR_2$ of 5 to 30 g/10 min (230° C., 2.16 kg).

The tensile strain at break properties of the composition are particular favourable. Values of over 200%, preferably over 250% are achievable.

The tensile strain at yield properties of the composition are particular favourable. Values of over 8%, preferably over 8.5% are achievable.

Charpy notched impact strength values are also high. Charpy notched impact strength values at 23° C. are preferably at least 8 $kJ/m^2$.

Low temperature charpy notched impact strength (at −20° C.) may be at least 3 $kJ/m^2$.

Production of Propylene Polymer A

The propylene polymer A may be produced by single- or multistage process polymerisation of propylene or propylene and -olefin and/or ethylene such as bulk polymerisation, gas phase polymerisation, slurry polymerisation, solution polymerisation or combinations thereof using conventional catalysts. A homo- or copolymer can be made either in loop reactors or in a combination of loop and gas phase reactor. Those processes are well known to one skilled in the art.

A suitable catalyst for the polymerisation of the propylene polymer A is any stereospecific catalyst for propylene polymerisation which is capable of polymerising and copolymerising propylene and comonomers at a temperature of 40 to 110° C. and at a pressure from 10 to 100 bar. Ziegler-Natta catalysts as well as metallocene catalysts are suitable catalysts. The use of Ziegler-Natta materials is preferred.

Production of Ethylene-Propylene Copolymer (Polymer B)

An ethylene propylene elastomeric copolymer may be produced by known polymerisation processes such as solution, suspension and gas-phase polymerisation using conventional catalysts. Ziegler-Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer is dried with dewatering in screens, mechanical presses or drying ovens. The polymer is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene elastomeric copolymers is also described in detail in e.g. U.S. Pat. No. 3,300,459, U.S. Pat. No. 5,919,877 and EP 0 060 090 A1.

Alternatively, elastomeric ethylene-propylene copolymers, which are commercially available and which fulfil the indicated requirements, can be used.

In a preferred embodiment, polymers A and B may be produced in a series of reactors, i.e. starting with the production of polymer A in a loop reactor and transferring the product into a gas phase reactor, where copolymer B is polymerised.

Heterophasic polymers of use in the invention are commercially available products available from suppliers such as Borealis. Suitable copolymers are sold by Borealis.

Additional Components

In a further embodiment, the composition of the invention may contain a further polyolefin component, in particular a polymer C which may be a polyethylene homopolymer or copolymer. This additional polyethylene component can be present at up to 20 wt % of the composition, e.g. up to 15 wt %, such as 5 to 20 wt % or 7.5 to 15 wt %.

This component can be an HDPE, in particular one having a density of at least 940 $kg/m^3$, e.g. 940 to 980 $kg/m^3$. Alternatively, polymer C may be an LLDPE or an LDPE, e.g. having a density between 905 and 935 $kg/m^3$. In one embodiment, there is no additional polymer C present.

The composition of the invention may further comprise conventional additives, such as antioxidants, stabilizers, acid scavengers, clarifying agents, colouring agents, anti-UV agents, nucleating agents, antistatic agents and mould release agents. Typically, these additives may be present at less than 2 wt % each, more preferably less than 1 wt % relative to the total weight of the composition.

It is particularly preferred if fillers such as talc or nanofillers are present in the compositions of the invention. Fillers of use in the invention can be particulate metal compounds especially particulate silicates, sulphates and carbonates. The metal employed is typically an alkaline earth metal such as calcium, barium or magnesium or Al. Aluminium, magnesium and calcium silicates are especially preferred. Specific fillers of interest are talc, calcium carbonate, mica, barium sulphate and wollastonite. There can be 0 to 25 wt %, preferably 5 to 25 wt % of fillers present in the composition of the invention, e.g. 7 to 22 wt % filler. The amount of filler present may preferably range from 10 to 20 wt % of the composition. Ideally that filler is a silicate, especially talc. The particle size of the filler may vary although typically the average particle size may be 10 to 300 microns.

Thus viewed from another aspect the invention provides a composition comprising:

(I) 65 to 92.5 wt % of a first component which is a polypropylene polymer comprising a) 40 to 85 wt % of a propylene polymer A having a melt flow rate ($MFR_2$) between 0.01 and 300 g/10 min, and b) 15 wt % or more of at least one propylene ethylene copolymer; and (II) 2.5 to 30 wt % of a second component comprising at least one ethylene alkyl (meth)acrylate polymer; and (III) 5 to 25 wt % of at least one filler, e.g. talc.

Glass Fibres

The compositions of the invention are preferably used in conjunction with reinforcing agents such as glass fibres as is well known in the art. The use of a coupling agent may also be used.

The composition in accordance with the present invention may also therefore have glass fibres added thereto. The amount of glass fibres added may represent from 0 to 50% of the weight of composition of the invention, preferably from 10 to 40%, e.g. 15 to 35%. The glass fibres may be selected form short cut or long (endless) glass fibres but typically the glass fibres are cut fibres having a length, prior to compounding with the polypropylene, of several millimeters, such as from 3 to 15 mm or longer, preferably 3.5 to 5 mm. Glass fibers of this type are commercially available and examples thereof are the trade designations P968 of OCV, T480 of NEG, Thermoflow 738 by Johns Manville or others.

Typically the glass fibers have a diameter of about 10 to 15 μm although also other diameters for glass fibers are contemplated in accordance with the present invention.

The composition in accordance with the present invention may also include a coupling agent for improving the coupling of the glass fibers in the polymer matrix. Any type of coupling agent may be used and illustrative examples thereof are maleic anhydride grafted propylene homopolymers or propylene-ethylene block-copolymers as well as Polybond 3150/3200 of Chemtura, Epolene G3003 of Eastman and Exxelor PO1015 or PO1020 of Exxon. Amounts of coupling agents depend from the type and amount of glass fibers but typically a coupling agent is added in an amount of from 0.5 to 5-wt % based on the weight of the composition. In a highly preferred embodiment, no coupling agent is employed.

Compositions free of any glass fibres and hence modifying polymers such as anhydride modified polymer are also covered.

Applications

The compositions of the invention are ideal for moulding, especially injection moulding. A part made of the polypropylene resin of the present invention has a low shrinkage.

Preferably, the shrinkage in any direction is less than 1.5%, and particularly less than 1.1%. Shrinkage can be measured longitudinally and transversely (on rectangular test pieces) or radially and tangentially on circular test pieces.

In the examples which follow, shrinkage is measured on circular disks where shrinkage is determined radially and tangentially. We measure therefore the shrinkage in the radius of the disk and also any shrinkage in circumference of the disk. The disk shaped test piece has a flow angle of 355° and a cut out of 5° and to determine the shrinkage, the chord value between the two end points on the disk circumference after the shrinkage procedure is compared to the corresponding chord value of the test piece mould. Preferably, the shrinkage in the radial and/or tangential directions is less than 1.5%, and particularly less than 1.1%.

Most importantly, the difference between the percentage shrinkage values (whether longitudinally and transversely or radially and tangentially) is preferably less than 0.1 percentage points, preferably less than 0.08 percentage points. This means that the shrinkage in the two directions (in particular radial and tangential) is almost the same leading to an absence of anisotropy in the formed part.

The shrinkage is measured as stated below in "Description of measurement methods".

In addition, parts made of the composition of the invention have a high scratch resistance Delta L. Preferably, the Delta L value is less than 1, especially less than 0.75. Delta L is the difference in brightness between an untreated surface of the resin and a surface of the resin in which a cross hatch is cut with a distance between each grid line of 2 mm with a steel ball tip having a diameter of 1 mm, a cutting force of 10 N and a cutting speed of 1000 mm/min.

The gloss values of the materials of the invention are also low giving therefore an ideal balance of gloss and scratch resistance. Low gloss is preferred for any vehicle interior.

The composition of the invention is particularly useful in producing moulded and/or extruded articles by employing of conventional injection moulding, blow moulding and/or extrusion techniques.

Preferably, these articles are body parts for automotive applications, either exterior or interior parts. The exterior parts may be bumper covers, exterior fascia, air dams, and other trim, the interior parts dash boards, air bag covers and the like.

Viewed from another aspect therefore the invention provides an injection moulded article comprising:

(I) 60 to 97.5 wt %, preferably 60 to 92.5 wt % of a first component which is a polypropylene polymer comprising
  a) 40 to 85 wt % of a propylene polymer A having a melt flow rate (MFR$_2$) between 0.01 and 300 g/10 min, and
  b) 15 wt % or more of at least one propylene ethylene copolymer; and
(II) 2.5 to 30 wt % of a second component comprising at least one ethylene alkyl (meth)acrylate polymer; and optionally
(III) 0 to 25 wt %, preferably 5 to 25 wt % of at least one filler.

The invention will now be described with reference to the following non limiting examples and FIGURE. FIG. 1 illustrates the main benefits of the present invention. As can be seen the compositions containing EMA are generally superior in the shrinkage/scratch resistance balance. The last composition shows that increases in EMA to higher levels can reduce anisotropy to zero albeit at the expense of scratch resistance.

Description of Measurement Methods

Melt Flow Rate (MFR2)

The melt flow rates MFR2 were measured under a load of 2.16 kg at 230° C. (for PP or PP-copolymers or any composition containing such polymers) and 190° C. (for PE), according to ISO 1133.

C3-Content

The propylene content was calculated by measuring the ethylene content by IR of whole polymer or polymer B (C3=1−C2).

Intrinsic Viscosity

The intrinsic viscosity was measured according to ISO 1628-1 (of October 1999) in decalin at 135° C.

Xylene Soluble:

Determination of xylene soluble fraction (XS):

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks. The solution from the first 100 ml vessel is evaporated in nitrogen flow and the residue is dried under vacuum at 90° C. until constant weight is reached.

$$wt-\% \ XS = \frac{m_1 \times v_0}{m_0 \times v_1} \times 100$$

Where
$m_0$ is the mass of test portion weighed, in grams
$m_1$ is the mass of residue, in grams
$v_0$ is the original volume of solvent taken (250 ml)
$v_1$ is the volume of the aliquot taken for determination (100 ml)
XS %=(100·m·Vo)/(mo·v); mo=initial polymer amount (g); m=weight of residue (g); Vo=initial volume (ml); v=volume of analysed sample (ml).

Shrinkage

The shrinkage is determined on centre gated, injection moulded circular disks (diameter 180 mm, thickness 3 mm, having an flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar After conditioning the specimen at room temperature for 96 hours the dimensional changes radial and tangential to the flow direction are measured for both disks. The average of both values is reported as final result.

Scratch Resistance

Injection moulded specimen, 60*60 mm, 3 mm thickness, mass temperature: 240° C.,
tool-temperature: 40° C., back pressure: 600 bar To determine the scratch resistance a Cross Hatch Cutter Model 420p, manufactured by Erichsen, was used. A cross hatch (40×40 mm, distance between each grid line 2 mm) was cut onto the specimen surface with fine grain (VW K09-grain). The instrument is equipped with a steel ball tip (1.0 mm). The cutting force is 10 N. A cutting speed of 1000 mm/min is used.

Scratch evaluation was carried out by measuring the L value by means of a spectral photometer before and after scratching acc DIN 5033 (CIE LAB, D65, 10°, 45/0). This measurement corresponds to the difference in brightness of the treated versus the untreated polymer surface. The change in brightness is expressed by the delta L value. A delta L<1.0 is considered as high scratch resistance and low scratch visibility respectively.

Notched Charpy Impact Strength

The notched Charpy impact strength measurement was carried out according to ISO 179/1 eA at 23° C. and −20° C. by using injection moulded test specimen as described in EN ISO 1873-2.

Tensile Strength:

Tensile strength properties were determined according to ISO 527-2. Injection moulded specimens of type 1A were used, which were prepared according to ISO 1873-2.

Strain at Yield:

Strain at yield (in %) was determined according to ISO 527-2. The measurement was conducted at 23° C. temperature with an elongation rate of 50 mm/min.

Stress at Yield:

Stress at yield (in MPa) was determined according to ISO 527-2. The measurement was conducted at 23° C. temperature with an elongation rate of 50 mm/min.

Tensile Modulus:

Tensile modulus (in MPa) was determined according to ISO 527-2. The measurement was conducted at 23° C. temperature with an elongation rate of 1 mm/min.

Tensile Strain/Stress Break:

Tensile strain [%] and stress [MPa] at break were determined according to ISO 527-2. The measurement was conducted at 23° C. temperature with an elongation rate of 50 mm/min.

EXAMPLES

Preparation of propylene polymer. The propylene polymer 1 (table 1) used for the present invention was prepared by the following procedure.

Polymerisation

Polymer 1 was produced in a pilot plant having a loop reactor and a fluid bed gas phase reactor connected in series. The catalyst, cocatalyst and donor were fed to the loop reactor. The reactor medium was flashed away before the solid polymer containing the active catalyst entered the gas phase reactor.

The prepolymerised supported Ti catalyst (ZN104 from Basell) was used in the polymerisation. Cocatalyst was tri-ethyl aluminium (TEAL 93% from Sigma-Aldrich) and external donor was dicyclopentyldimethoxysilane (DCP-DMS Wacker Chemie (99%)). TEAL/donor ratio (g/g) was 3 and TEAL/C3 ratio was 0.23 g/kg.

In the first stage (loop reactor) a PP homopolymer matrix (polymer A) was produced and the polymerisation was continued in the second stage (gas phase reactor) which produced the rubbery copolymer (polymer B). The polymerization temperature was 70° C. in the loop reactor and 80° C. in the gas phase reactor. The MFR of the first stage and the final product were adjusted with separate hydrogen feeds. The rubbery copolymer was produced with a low comonomer ratio, C2/(C2+C3)=0.46 (mol/mol). The homopolymer matrix (polymer A) had a MFR of 42 g/10 min.

Since polymer 1 was produced in a sequential polymerisation process polymer B was not accessible in pure form. Hence just the properties of the final blend can be determined. Polymer 1 had a MFR of 20.5 g/10 min, an ethylene content of 19.3 wt % (by FTIR) and a xylene soluble fraction (polymer B) at RT of 25 wt %. The intrinsic viscosity (IV) of the fraction measured in decalin at 135° C. according to standard procedures was 1.57 dl/g.

Standard additives Irganox B225 (0.25%), synthetic hydrotalcite (0.05.wt %), calcium stearate (0.05 wt %) and talc (10 wt %) were added.

Table 1 shows the polymer properties of the material used in the examples which follow i.e. polymer 1 above.

TABLE 1

Polymer properties of the base resin used in all examples

| Property | Value |
|---|---|
| Matrix MFR | 42 g/10 min |
| XS-content | 25 wt % |
| C2-content of XS | 60.8 wt % |
| Overall C2-content | 19.3 wt % |
| Intrinsic viscosity of XS | 1.6 dl/g |
| Final MFR of blend | 20.5 g/10 min |

Ex 1, 2 and 3 are part of the present invention while the other compositions listed are comparative examples (C1 to C3).

TABLE 2

Composition and examined properties of comparative compounds and compounds based on the present invention

| | Unit | C1 | C2 | C3 | Ex 1 | Ex 2 | Ex 3 |
|---|---|---|---|---|---|---|---|
| Polymer 1 | wt % | 87.45 | 77.45 | 77.45 | 77.45 | 77.45 | 67.45 |
| Oleamide | wt % | 0.2 | 0.2 | 0.2 | 0.2 | 0.2 | 0.2 |
| Calcium Stearate | wt % | 0.05 | 0.05 | 0.05 | 0.05 | 0.05 | 0.05 |
| Synthetic Hydrotalcite | wt % | 0.05 | 0.05 | 0.05 | 0.05 | 0.05 | 0.05 |
| IRGANOX B225 | wt % | 0.25 | 0.25 | 0.25 | 0.25 | 0.25 | 0.25 |
| Carbon Black Masterbatch (Plasblack - MB PP3638) | wt % | 2 | 2 | 2 | 2 | 2 | 2 |
| Talc (Ankerpoort TITAL 15) | wt % | 10 | 10 | 10 | 10 | 10 | 10 |
| BS 2541 (HDPE) | wt % | | 10 | | | | |
| FA 3220 (LDPE) | wt % | | | 10 | | | |

TABLE 2-continued

Composition and examined properties of comparative compounds and compounds based on the present invention

|  | Unit | C1 | C2 | C3 | Ex 1 | Ex 2 | Ex 3 |
|---|---|---|---|---|---|---|---|
| ELVALOY 1330EAC | wt % |  |  |  | 10 |  | 20 |
| ELVALOY 1913AC | wt % |  |  |  |  | 10 |  |
| Flowability |  |  |  |  |  |  |  |
| MFR 230° C./2, 16 kg | g/10 min | 20 | 15.2 | 14.1 | 17.7 | 17.5 | 16.5 |
| Shrinkage on circular plate 180/3 mm |  |  |  |  |  |  |  |
| SH RADIAL | % | 1.02 | 1.08 | 0.99 | 0.98 | 1.01 | 0.84 |
| SH TANGENTIAL | % | 0.89 | 0.95 | 0.83 | 0.95 | 0.95 | 0.84 |
| SH DIFFERENCE | % | 0.13 | 0.13 | 0.16 | 0.03 | 0.06 | 0.00 |
| Erichsen scratch test (load = 10N) |  |  |  |  |  |  |  |
| DELTA L | None | 1.40 | 0.45 | 0.17 | 0.18 | 0.50 | 2.01 |
| Gloss |  |  |  |  |  |  |  |
| Gloss 60° on K09 (IOS) | % | 2.9 | 2.9 | 2.0 | 2.8 | 3.0 | 2.7 |
| Tensile test ISO 527 1B4 |  |  |  |  |  |  |  |
| TENSILE MODULUS | MPa | 1498.6 | 1421.8 | 1316.8 | 1101.8 | 1246.3 | 890.5 |
| TENSILE STRESS AT YIELD | MPa | 22.6 | 22 | 20.4 | 19.1 | 20.2 | 16.5 |
| TENSILE STRAIN AT YIELD | % | 6.9 | 7.4 | 7.2 | 9.7 | 8.8 | 13 |
| TENSILE STRENGTH | MPa | 22.6 | 22 | 20.4 | 19.1 | 20.2 | 16.5 |
| TENSILE STRAIN AT TENSILE STRENGTH | % | 6.9 | 7.4 | 7.2 | 9.7 | 8.8 | 13.0 |
| TENSILE STRESS AT BREAK | MPa | 11.3 | 12.6 | 13.6 | 12.3 | 12.3 | 12.8 |
| TENSILE STRAIN AT BREAK | % | 130 | 33 | 50 | 330 | 350 | 329 |
| Charpy NIS ISO 179 1eA |  |  |  |  |  |  |  |
| IMPACT STRENGTH @ +23° C. | kJ/m$^2$ | 6 | 7.7 | 7.2 | 10.1 | 8.1 | 33.9 |
| IMPACT STRENGTH @ −20° C. | kJ/m$^2$ | 3.2 | 3.2 | 3.3 | 3.4 | 3.1 | 4.8 |

The shrinkage and scratch resistance results are presented in FIG. 1. We have observed that whilst improvements in scratch resistance are generally linked to an increasing EAA content, improvements in shrinkage properties are generally only achievable at lower EAA contents, e.g. 30 wt % or less. Polymer compositions 1 and 2 possess both very low scratch resistance and low shrinkage making them highly preferred polymer compositions for moulded parts.

The invention claimed is:

1. A composition comprising:
   (I) 60 to 92.5 wt % of a first component which is a polypropylene polymer comprising
      a) 40 to 85 wt % of a propylene homopolymer A having a melt flow rate (MFR$_2$) between 0.01 and 300 g/10 min, and
      b) 15 wt % or more of at least one propylene ethylene copolymer; and
   (II) 2.5 to 30 wt % of a second component comprising at least one ethylene C$_1$-C$_4$-alkyl (meth)acrylate polymer; and
   (III) 5 to 25 wt % of at least one filler,
      wherein the difference between radial and tangential shrinkage of the composition is less than 0.1 percentage points.

2. A composition as claimed in claim 1 wherein polymer (II) is an ethylene C$_1$-C$_4$-alkyl acrylate polymer.

3. A composition as claimed in claim 1 wherein polymer (II) is ethylene methyl acrylate.

4. A composition as claimed in claim 1 wherein the amount of polymer (II) is in the range of 7.5 to 15 wt %.

5. A composition as claimed in claim 1 wherein polymer (I) is a heterophasic polypropylene polymer.

6. A composition as claimed in claim 1 comprising:
   (I) 65 to 92.5 wt % of a first component which is a polypropylene polymer comprising
      a) 40 to 85 wt % of a propylene homopolymer A having a melt flow rate (MFR$_2$) between 0.01 and 300 g/10 min, and
      b) 15 wt % or more of at least one propylene ethylene copolymer; and
   (II) 2.5 to 30 wt % of a second component comprising at least one ethylene C$_1$-C$_4$-alkyl (meth)acrylate polymer; and
   (III) 5 to 25 wt % of at least one filler.

7. A composition as claimed in claim 1 having a Delta L value of less than 1.

8. A moulded article comprising a composition as defined in claim 1.

9. A process for making a composition as defined in claim 1 comprising obtaining a first component (I) as hereinbefore defined and blending said first component with said second component (II) and third component (III).

10. A moulded article of claim 8, wherein the article is an injection moulded article.

11. A composition as claimed in claim 6, wherein the filler comprises talc.

* * * * *